US008572179B2

(12) United States Patent
Meenan et al.

(10) Patent No.: US 8,572,179 B2
(45) Date of Patent: *Oct. 29, 2013

(54) INTEROPERABILITY USING A LOCAL PROXY SERVER

(75) Inventors: Patrick Meenan, Gainesville, VA (US); David Clyde Chiles, Mitchellville, MD (US); Jeffrey J. Damick, Manassas, VA (US)

(73) Assignee: Bright Sun Technologies, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/344,165

(22) Filed: Jan. 5, 2012

(65) Prior Publication Data

US 2012/0110114 A1    May 3, 2012

Related U.S. Application Data

(63) Continuation of application No. 12/796,519, filed on Jun. 8, 2010, now Pat. No. 8,095,596, which is a continuation of application No. 10/330,541, filed on Dec. 30, 2002, now Pat. No. 7,756,928.

(51) Int. Cl.
G06F 15/16    (2006.01)
(52) U.S. Cl.
USPC .......................................... 709/205; 709/219
(58) Field of Classification Search
None
See application file for complete search history.

(56) References Cited

U.S. PATENT DOCUMENTS

| 5,826,000 | A | 10/1998 | Hamilton |
| 5,852,722 | A | 12/1998 | Hamilton |
| 6,052,750 | A | 4/2000 | Lea |
| 6,085,236 | A | 7/2000 | Lea |
| 6,198,479 | B1 | 3/2001 | Humpleman et al. |
| 6,314,447 | B1 | 11/2001 | Lea et al. |
| 6,314,459 | B1 | 11/2001 | Freeman |
| 6,349,352 | B1 | 2/2002 | Lea |
| 6,363,434 | B1 | 3/2002 | Eytchison |
| 6,434,596 | B1 | 8/2002 | Ludtke et al. |
| 6,523,696 | B1 | 2/2003 | Saito et al. |
| 6,546,419 | B1 | 4/2003 | Humpleman et al. |
| 6,643,684 | B1 | 11/2003 | Malkin et al. |
| 6,691,150 | B1 | 2/2004 | Yoshino et al. |
| 6,694,349 | B1 | 2/2004 | Zou |
| 6,801,507 | B1 | 10/2004 | Humpleman et al. |
| 6,806,977 | B1 | 10/2004 | Freeny et al. |
| 6,868,447 | B1 | 3/2005 | Slaughter et al. |
| 6,898,618 | B1 | 5/2005 | Slaughter et al. |
| 6,904,519 | B2 | 6/2005 | Anand et al. |

(Continued)

FOREIGN PATENT DOCUMENTS

WO    WO 01/22661 A2    3/2001

OTHER PUBLICATIONS

"Understanding Universal Plug and Play" white paper. Microsoft Corporation 2000, 44 pages.

(Continued)

*Primary Examiner* — Scott Christensen
(74) *Attorney, Agent, or Firm* — Fenwick & West LLP

(57) ABSTRACT

A home-networking gateway may automatically provide a function based on data identified on a device on a home network. The home-networking gateway may perform the function using another device that is capable of performing the function and is accessible to the home-networking gateway.

19 Claims, 5 Drawing Sheets

(56) References Cited

U.S. PATENT DOCUMENTS

| | | |
|---|---|---|
| 6,918,123 B1 | 7/2005 | Shteyn |
| 6,924,727 B2 | 8/2005 | Nagaoka et al. |
| 6,950,875 B1 | 9/2005 | Slaughter et al. |
| 7,016,966 B1 | 3/2006 | Saulpaugh et al. |
| 7,107,481 B2 | 9/2006 | Baba |
| 7,200,644 B1 | 4/2007 | Flanagan |
| 2001/0038392 A1 | 11/2001 | Humpleman et al. |
| 2002/0029256 A1* | 3/2002 | Zintel et al. .................. 709/218 |
| 2002/0133581 A1* | 9/2002 | Schwartz et al. ............. 709/223 |
| 2004/0203606 A1 | 10/2004 | Souissi et al. |
| 2004/0240451 A1 | 12/2004 | Lee et al. |
| 2005/0246624 A1 | 11/2005 | Humpleman et al. |
| 2005/0273508 A1 | 12/2005 | Humpleman et al. |
| 2006/0053375 A1 | 3/2006 | Humpleman et al. |
| 2006/0218650 A1 | 9/2006 | Costa-Requena et al. |
| 2006/0288071 A1 | 12/2006 | Bigioi et al. |
| 2007/0094366 A1 | 4/2007 | Ayoub |
| 2007/0157260 A1 | 7/2007 | Walker |

OTHER PUBLICATIONS

Alexander, S. and Droms, R., "DHCP Options and BOOTP Vendor Extensions (Request for Comments: 2132)", The Internet Engineering Task Force, Mar. 1997, pp. 1-32.

* cited by examiner

INTEROPERABILITY USING A LOCAL PROXY SERVER

This application is a continuation of U.S. patent application Ser. No. 12/796,519, filed Jun. 8, 2010 (now allowed) now U.S. Pat. No. 8,095,596, which is a continuation of U.S. patent application Ser. No. 10/330,541, filed Dec. 30, 2002 (now U.S. Pat. No. 7,756,928), the disclosures of which are expressly incorporated herein by reference to their entireties.

TECHNICAL FIELD

This description relates to providing services to devices in a computer network using a local proxy server.

BACKGROUND

In a network of computing devices, each of several networked devices may have particular components or capabilities that are capable of performing one or more functions. As a consequence, the network of computing devices may include a variety of devices having a wide variety of components and/or capabilities.

For example, a network may include a general-purpose computer that includes a storage device and that has the capability of storing data on the storage device. The same network also may include a stereo entertainment system that is capable of playing music, and a router or gateway that is capable of sending data to a computing device that is accessible through the network.

Moreover, in a network environment, the components and capabilities of one networked device may be leveraged by other networked devices. In the above example, the stereo may be able to leverage storage capabilities at the general-purpose computer.

SUMMARY

Interoperability in a home network may be provided using a local proxy server. An advertised capability of a first device in the home network, and a function requested of the first device that corresponds to the advertised capability both are identified. A second device capable of performing the function from among multiple devices that are remote to the first device and accessible to the local proxy server is selected, and that selected second device is coordinated with to perform the function.

Implementations may include one or more of the following features. For example, the second device may be selected without human intervention. The presence of the first device in a home network may be detected, and the function to be performed may be determined based on the presence of the first device in the home network. Data on the first device in the home network may be identified, and the function to be performed may be determined based on the identified data.

A set of rules may be accessed. Each rule may associate a function with an advertised capability. The function to be performed may be determined based on the identified advertised capability and the accessed workflow information. The second device capable of performing the function may be selected based on accessed set of rules. The function may be performed using the selected second device in a manner that is transparent to an operator for whom the function is performed.

The second device may be a device in the home network or may be a device associated with a trusted system. A communication session may be established between the local proxy server and the trusted system, or may be established between the local proxy server and the first device in the home network.

Implementations of the techniques discussed above may include a method or process, an apparatus or system, or computer software on a computer-accessible medium.

The details of one or more implementations set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

A home-networking gateway may automatically provide a function based on data identified on a device on a home network. The home-networking gateway may perform the function using another device that is capable of performing the function and is accessible to the home-networking gateway.

Figure 1:
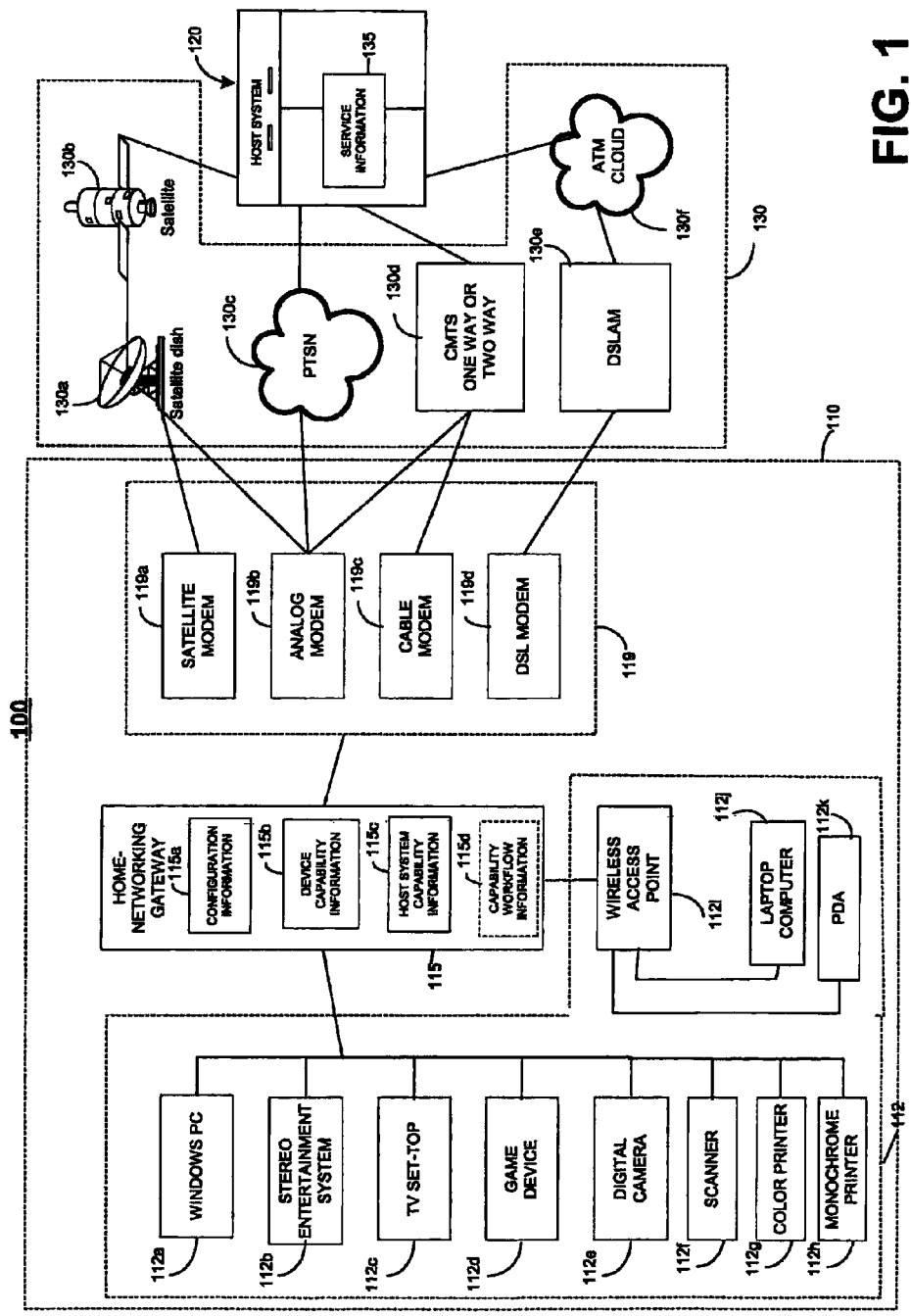
FIG. 1 is a block diagram illustrating an exemplary communications system capable of providing services to devices used in a home network.

Referring to FIG. 1, a home networking system 100 includes multiple home-networked devices 112 ("devices") connected to each other and to a home-networking gateway 115. Some of the devices are wireless devices. The home-networking gateway 115 is connected to a host system 120 through a communication device 119 over communication links 130.

The home networking system 100 enables the devices 112 to communicate with the host system 120 through the home-networking gateway 115 using the single communication device 119. The devices 112, the home-networking gateway 115, and the communication device 119 may be included in a home network 110 physically located in a personal residence (e.g., a single-family dwelling, a house, a townhouse, an apartment, or a condominium). The home-networking gateway 115 generally is local to the home network 110. The home-networking gateway 115 is located logically between the devices 112 and a host system 120 that is external to the home network 110. The host system 120 may be, for example, an Internet access provider device, an Internet service provider device, an online host system proxy server, or another external system device.

The devices 112 and the home-networking gateway 115 typically are located in a physical place that enables the home-networking gateway 115 to network with the devices 112. In one implementation, for example, the home-networking gateway 115 is physically located in a personal residence, and the devices 112 are physically located such that communications with the home-networking gateway 115 are enabled and maintained. For instance, when the home-networking gateway 115 is physically located in a personal residence, the devices 112 also may be physically located in the personal residence. However, the location of the home-networking gateway 115 in the personal residence does not necessarily preclude one or more of the devices 112 from being networked to the home-networking gateway 115 from a remote location. Similarly, the location of the home-networking gateway in the personal residence does not necessarily preclude use of one or more of the devices 112 from outside of the personal residence or communication by those devices with the host system 120 through the home-networking gateway 115. For instance, the devices 112 may include one or more portable computing devices that may be taken outside of the personal residence and still remain connected through a wireless access point to the home-networking gateway 115 located within the personal residence.

The devices 112 may include one or more general-purpose computers (e.g., personal computers), one or more special-purpose computers (e.g., devices specifically programmed to communicate with the home-networking gateway 115 and/or the host system 120), or a combination of one or more general-purpose computers and one or more special-purpose computers. Other examples of devices 112 include a workstation, a server, an appliance (e.g., a refrigerator, a microwave, and an oven), an intelligent household device (e.g., a thermostat, a security system, a heating, ventilation and air conditioning (HVAC) system, and a stereo system), a device, a component, other physical or virtual equipment, or some combination of these elements capable of responding to and executing instructions within the system architecture.

FIG. 1 shows several implementations and possible combinations of devices and systems used within the home networking system 100. For brevity, only a few illustrative elements are included in home networking system 100.

As illustrated by FIG. 1, examples of devices 112 may include, but are not limited to, a personal computer with a Windows™ operating system (OS) 112a, a stereo entertainment system 112b capable of playing music, a TV set-top box 112c, a game device 112d, a digital camera 112e, a scanner 112f that digitizes an optical image to produce an image represented as binary data, a color printer 112g, a monochrome printer 112h (such as a laser printer than uses black toner), a wireless access point (WAP) 112i, a laptop or otherwise portable computer 112j, and a personal digital assistant (PDA) 112k. Some of the devices, such as a personal computer with Windows™ OS 112a, a stereo entertainment system 112b, a TV set-top box 112c, a game device 112d, and a scanner 112e, typically communicate with the home-networking gateway 115 through a wired network.

Some of the other devices, such as a laptop computer 112j and a PDA 112k, typically communicate with the home-networking gateway 115 using a wireless access point 112i. When devices communicate using wireless access point 112i, they may be referred to as wireless devices. Wireless devices are not limited to portable devices. For example, a desktop personal computer, such as a personal computer with a Windows™ OS 112a, may communicate using wireless access point 112i. Specifically, the wireless devices communicate over a wireless communications pathway to the wireless access point 112i. The wireless access point 112i is connected to home-networking gateway 115 through the wired network and transmits communications received from wireless devices to the home-networking gateway 115. In some implementations, the wireless access point 112i may be a component of the home-networking gateway 115.

A wireless communications pathway may use various protocols to communicate from a wireless devices to a wireless access point 112i. For example, the wireless communications pathway may use wireless technology based on the Institute of Electrical and Electronics Engineers, Inc. (IEEE) 802.11 standard (such as 802.11b or 802.11a). The wireless communications pathway also may use wireless technology based on the Bluetooth approach for short range wireless communications, other personal area network (PAN) technologies, or other wireless technology, such as the HiperLan2 standard by the European Telecommunications Standards Institute (ETSI).

Some of the devices 112, such as the personal computer with a Windows™ OS 112a, the laptop computer 112j, and the PDA 112k, include software for logging on to the host system 120 using a particular user associated with the user of the device. Such devices may be referred to as client devices. Other devices, such as stereo entertainment system 112g, may include software for logging on to host system 120 without identifying an associated user of the user of the device. Yet other devices, such as TV set-top 112c and game device 112d, may be configured to function either as a client device or a non-client device depending on the function being performed.

The home-networking gateway 115 may include a home gateway device, such as a gateway, a router, or another communication device. The home-networking gateway 115 also may include a digital hub capable of receiving broadcast video signals, receiving communication data (such as through a broadband connection), and distributing the signals and data to devices 112. The home-networking gateway 115 may include another communications device and/or a home entertainment device, such as a radio tuner, a TV tuner, a portable music player, and a personal video recorder. The home-networking gateway 115 communicates with a host system 120 over communications links 130. In some implementations, the host system 120 may be an online access provider, such as an Internet access provider or an Internet service provider.

The home-networking gateway 115 typically connects to the host system 120 using a communication device 119. Examples of the communication device 119 may include (and are not limited to) a satellite modem 119a, an analog modem 119b, a cable modem 119c, and a DSL modem 119d. The home-networking gateway 115 uses the communication device 119 to communicate through communication links 130 with the host system 120. The communication links 130 may include various types of communication delivery systems that correspond to the type of communication device 119 being used. For example, if the home-networking gateway 115 includes a satellite modem 119a, then the communications from a device 112 and an associated home-networking gateway 115 may be delivered to the host system 120 using a satellite dish 130a and a satellite 130b. The analog modem 119b may use one of several communications links 119, such as the satellite dish 130a and satellite 130b, the Public Switched Telephone Network (PSTN) 130d (which also may be referred to as the Plain Old Telephone Service or POTS), and the Cable Modem Termination System (CMTS) 130d. The cable modem 119c typically uses the CMTS 130d to deliver and receive communications from the host system 120. The DSL modem 119d typically delivers and receives communications with the host system 120 through a Digital Subscriber Line Access Multiplexer (DSLAM) 130e and an Asynchronous Transfer Mode (ATM) network 130f.

The home networking system 100 may use various protocols to communicate between the devices 112 and the home-networking gateway 115 and between the home-networking gateway 115 and the host system 120. For example, a first protocol may be used to communicate between the devices 112 and the home-networking gateway 115, and a second protocol may be used to communicate between the home-networking gateway 115 and the host system 120. In one implementation, the first protocol and the second protocol may be the same. In another implementation, the first protocol and the second protocol may be different. The home-networking gateway 115 may include different hardware and/or software modules to implement different home networking system protocols.

The home-networking gateway 115 may store or otherwise include configuration information 115a, device capability information 115b, host system capability information 115c, and capability workflow information 115d. The home-networking gateway 115 may include configuration information 115a. The configuration information 115a may be stored as a table, a list, or other type of data structure (e.g., an Extensible Mark-up Language (XML) file). The configuration information 115a may include identifying information 115a, such as a MAC ("Media Access Control") address and/or a network address, that may uniquely identify a home-networking gateway 115. The identifying information 115a also may include a user account that is permitted to access the host system 120 and connectivity information that describes how to establish a communication session with the host system 120.

The configuration information 115a may include device information for devices 112 that are associated with the home-network 110. Device information may include a device identifier for a device, such as devices 112a-112k. The device identifier may include a hardware device identifier, such as a MAC address, and/or a network address, such as a static IP address associated with the device or a dynamic IP address. The dynamic IP address may be assigned by home-networking gateway 115, by some other network device, or by the host system 120 through the Dynamic Host Configuration Protocol or another protocol that enables the dynamic allocation of an IP address to a device on a network. The device information associated with each device may include, for example, the type of device (e.g., a client or a non-client device), the class of device (e.g., a gaming device, a personal computer, or a PDA), the type of platform (e.g., the type of hardware, such as a personal computer with a Windows™ OS, a PDA, a home appliance, or an entertainment device), and/or the operating environment (e.g., the operating system type and/or version).

The device information also may include a user-assigned name. The user-assigned name may be referred to as a familiar name or a nickname. For example, an identifier for a particular game device may be associated with the user-assigned name of "Billy's game device." The device information also may include parental control information or other types of access restrictions that are associated with the device. The parental control information may include different levels of parental control restrictions associated with the device.

The configuration information 115a may include protocol information necessary to configure the home-networking gateway 115 to communicate with devices 112. Protocol information may include protocol information that describes how to establish communication with one or more of devices 112, how to configure the wireless access point 112i, or how to configure wireless devices, such as the laptop computer 112j or the PDA 112k. The configuration information for how to configure the wireless access point 112i, the laptop computer 112j, and the PDA 112k to communicate with one another may be referred to as wireless configuration information. Wireless configuration information stored on the home-networking gateway may include a security key, such as a wired equivalent privacy (WEP) key that may be used to encrypt and decrypt transmitted data, and a wireless network name, such as a service set identifier (SSID) that identifies the particular network. The configuration information 115a also may include other types of wireless configuration information, such as a level of encryption (e.g., 40-bit encryption or 128-bit encryption) associated with a WEP key. The storage of such wireless configuration information may be useful for a wireless device, such as laptop computer 112f that must maintain common configuration information with a wireless access point to enable communications with the wireless access point. For instance, a wireless device and a wireless access point may be required to maintain the following configuration information in common to enable them to communicate: a WEP key, a SSID, a list of devices that are permitted access, and a level of encryption associated with the WEP key (e.g., 40-bit encryption or 128-bit encryption).

The configuration information 115a also may include a list of devices that are permitted access to the home network. For example, the configuration information 115a may include a list of MAC addresses that uniquely identify the devices that are permitted access to the home network.

The home-networking gateway 115 also may include device capability information 115b that identifies capabilities and components of devices 112 that are available for use by the home-networking gateway 115. The home-networking gateway 115 may use the device capability information 115b to provide a service using a capability or a component of one of the devices 112 to another of the devices 112. The device capability information 115b may be stored in a table, a list, or other type of data structure (e.g., an XML file). The device capability information 115b may include a list of capabilities or components, and associate a device with each listed capability or component, as illustrated in the table below.

| CAPABILITY | DEVICE | PRIORITY |
| --- | --- | --- |
| Storage | Windows PC 112a | 1 |
| Camera | Digital camera 112e | 1 |
| Monochrome printing | Color printer 112g | 2 |
| Monochrome printing | Monochrome printer 112h | 1 |
| Color printing | Color printer 112g | 1 |

Although the illustrated table uses a reference number of FIG. 1 to identity a particular device, the device capability information 115b may use device identifying information, such as a MAC address, as described previously. Additionally or alternatively, the device capability information 115b may identify a particular device using a device nickname, which was described previously.

In some implementations, the device capability information 115b also may include a priority to indicate the relative preference for using the device to perform the capability. For example, as illustrated in the table, monochrome printing is available both using the color printer 112g and using the monochrome printer 112h. The priority of monochrome printing using monochrome printer 112h is one, and the priority of monochrome printing using color printer 112g is two. The priority of the monochrome printer 112h is lower relative to the priority of color printer 112g. This indicates that the monochrome printer 112h is preferred over the color printer 112g for monochrome printing. This may be, for example, because the cost to print a monochrome page on the monochrome printer 112h is lower than the cost to print a monochrome page on the color printer 112g. A device also may be preferred over a different device offering the same capability, for example, due to the device's location, such as when one device is more centrally located than another device.

The home-networking gateway 115 may include host system capability information 115c that identifies services accessible using the host system 120. The home-networking gateway 115 may use the host system capability information 115c to provide a host system-based service to one of the devices 112. The host system capability information 115c may be stored in a table, a list, or other type of data structure (e.g., an XML file). The host system capability information 115c may include a list of services available from the host system 135. In some implementations, the host system capability information 115c also may include a list of services available from systems in addition to the services available from the host system 120. For example, the host system capability information 115c may include a list of web services and an Internet address associated with each web service. In some implementations, the host system capability information 115c also may include information about how to access the identified service (e.g., connection information, user account and password information, or information to initiate the identified service using a remote procedure call).

Information about host system capabilities may be provided from the host system 120 to the home-networking gateway 115. The information about host system capabilities may be stored as host system capability information 115c. For example, a service information directory 124 may identify the services available from the host and, optionally, how to access each of the services using the host system, may be accessible to the home-networking gateway 115. The home-networking gateway 115 may access the service information directory 124 and store appropriate information on the home-networking gateway 115.

Alternatively, information about host system capabilities may be available to the home-networking gateway 115 using a protocol that supports automatic discovery of system capabilities, such as UPnP ("Universal Plug and Play"). When the home-networking gateway 115 and the host system 120 establish a connection, the host system 120 sends a message that announces its presence and its capabilities, as does the home-networking gateway 120. By using UPnP, the home-networking gateway 115 and the host system 120, each become aware of the capabilities of the other. The home-networking gateway 115 stores the capabilities of the host system 120 in the host system capability information 115c. In some implementations, the host system 120 also may store the capabilities of the home-networking gateway 115 and to enable the host system 120 leveraging of home network capabilities.

The home-networking gateway 115 may include capability workflow information 115d that identifies a sequence (or other type of collection) of one or more procedures to be accomplished when a particular capability or a particular device is detected. The home-networking gateway 115 may use the capability workflow information 115d to automatically provide one or more capabilities, services, or both without receiving an explicit request from a device to perform a particular service or use a particular capability. The capability workflow information 115d may be stored as a table, a list, or other type of data collection (e.g., an XML file) that associates a particular capability or a particular device with a particular script that identifies a procedure or procedures to be performed. The capability workflow information 115d also may includes the script or other procedures to be performed. Alternatively or additionally, the script or other procedures may be stored remotely from the home-networking gateway 115. For example, the script or other procedures may be stored on storage local to the personal computer with a Windows™ OS 112a. The home-networking gateway 115 executes the particular script when the device or the capability is detected.

When a device, such as one of devices 112, is connected to the home network, the home-networking gateway 115 and the device establish communications using a protocol known to both devices. For example, UPnP may be used. When the device is connected to the home network, the device may announce its presence by sending a message over the network. The sent message may include device identifying information and a list of one or more capabilities or components that are associated with the device. The home-networking gateway 115 may receive the message and detect the device and the device's capabilities based on the received message. The home-networking gateway 115 may store each capability in association with device identifying information in device capability information 115b. The home-networking gateway 115 also may receive device identifying information from the detected device and store the received information in configuration information 115a. In some implementations, the home-networking gateway 115 may receive and store other types of information, such as a device nickname and parental control information, that is associated with the device.

A device, such as one of the devices 112, may request a service from the home-networking gateway 115. The home-networking gateway 115 receives the service request and accesses the device capability information 115b to determine whether the to service is available from one of the other devices on the home network. If so, the home-networking gateway 115 leverages the capability or the component of the device to provide the service to the requesting device. The home-networking gateway may be said to spoof, or otherwise fool, a networked device, such as one of devices 112, by the appearance that the home-networking gateway 315 itself provides capabilities that are provided using a second networked device. In this way, the home-networking gateway may transparently provides a service to the networked device using the second networked device such that the networked device is unaware that the second networked device is providing the capability.

For example, the PDA 112k may send to the home-networking gateway 115 a request to store a data file (or other type of data collection). The sent request includes the data file to be stored. When the home-networking gateway 115 receives the storage request and the associated data file, the home-networking gateway 115 accesses the device capability information 115b and determines that a storage capability is available on the Windows PC 112a. The home-networking gateway 115 forwards to the Windows PC 112a the storage request and the associated data file. The Windows PC 112a stores the data file. Using the device capability information 115b, the home-networking gateway 115 may be able to automatically trigger an appropriate process to leverage the detected capability without requiring user intervention. In this example, the home-networking gateway 115 automatically initiates a process on the Windows PC 112a to store the data file received from the PDA 112k.

More elaborate scenarios are possible, as one skilled in the art would appreciate. For instance, when a person drives the person's automobile into the garage of the person's residence, the stereo system in the automobile may automatically establish a wireless connection with home network. This automated discovery may be accomplished, for example, using Blue Tooth wireless support. The automobile stereo system may announce its presence and its settings on the home network, and the home-networking gateway may respond by executing a script identified by capability workflow information 115d to automatically perform a series of actions. For example, the home-networking gateway 115 may power on a home entertainment system and tune a radio on the home entertainment system to the same station as set in the automobile stereo system. Additionally or alternatively, when the home-networking gateway perceives the automobile stereo system is on the network, the home-networking gateway may turn on a predetermined set of lights, open electric window shades, adjust the home thermostat, and turn on a general-purpose computer.

Similarly, the home-networking gateway 115 may advertise content that is physically stored host system 120 and services available thorough a host system service as though the content was stored on the home-networking gateway 115 itself. This may allow one of the devices 112 to perceive the content on the home-networking gateway 115 without requiring that the content itself be stored on the home-networking gateway 115. The home-networking gateway 115 may access and provide a host system service to the home network as though the service was provided by the home-networking gateway 115. The capability to spoof host system capabilities may be particularly advantageous when large amounts of capacity is required, for example, in the storage of music and movies. The content is stored outside of the home network, and yet the content is transparently available to the home-networking gateway. For example, a library of movies or sound recordings may be stored on the host system and yet transparently available for access by one of the devices 112. This may result in a decreased amount of storage required in the home network 110.

Additionally or alternatively, the host system 120 may be used for off-site storage of memorable or valuable data files. For example, irreplaceable historic or family pictures may be digitized using scanner 112f and saved both on storage located on the home-network 110 and on storage located on the host system 120. The redundant pictures on the host system 120 may be preserved in the event of a catastrophic loss of the storage on the home network 110. The irreplaceable content may be more easily accessible outside of the home network, which may encourage a greater use of off-site storage for important or irreplaceable items.

In another example, the home-networking gateway 115 may spoof a music stream from a host system as local music storage. The music service on the host system may be advertised as local music storage.

The home-networking gateway 115 may provide a service or a capability available from one of the devices 112 or from the host system 120 based on the detection of a device or a capability, without requiring an explicit request from a device for the service. For example, the home-networking gateway 115 may detect a particular type of device or a particular capability, for example, when a device announces its presence and its capability on the network using UPnP. The home-networking gateway 115 may determine whether a script is associated with the detected device or the detected capability by capability workflow information 115d. If so, the home-networking gateway 115 executes the associated script to provide a service or capability to the home network.

For example, when the digital camera 112e is connected to the home network, the digital camera 112e announces its presence using UPnP by sending a message over the home network. The digital camera 112e also announces in the message a capability as a camera and a storage capability that includes stored digital photographs. The home-networking gateway 115 receives the message and sends a reply message. The reply message by the home-networking gateway 115 announces the presence of the home-networking gateway 115 and the capabilities available through the home-networking gateway 115. The capabilities included in the reply message are the capabilities identified in the device capability information 115b and/or the services identified in the host system capability information 115c.

Based on the capability workflow information 115d, the home-networking gateway 115 executes a script associated with the detection of photographs at a remote device with which it communicates. The script also may be part of capability workflow information 115d or may be stored elsewhere, as described either with respect to capability workflow information 115d. The home-networking gateway 115 may access the photographs stored in the digital camera 112e and may store the photographs in a location specified in the script (e.g., on storage associated with the personal computer 112a), send the stored photographs to a photograph print service available from a website and order a predetermined quantity and type of photograph prints, and/or post the stored photographs to a family photograph album web page so that family members may access the photographs from a remote location. Using the interoperability provided by the home-networking gateway 115, the photographs taken with the digital camera 112e are stored locally, sent to a photograph print service, and/or published in a family photograph album, without user intervention.

The combination of the interoperability provided by the home-networking gateway and a device synchronization function may be particularly advantageous. For example, when a PDA establishes a wireless connection with the home-networking gateway, the PDA may announce its presence on the home network. Based on the detection of the PDA, the home-networking gateway 115 may initiate a synchronization function that transparently uses storage that is available through the home-networking gateway and a personal information management function that provides a calendar and address book by the host system 120. For example, the home-networking gateway 115 may synchronize, or otherwise copy, a portion or all of the information from a calendar and an address book on the PDA 112k to storage on the home network, such as storage associated with the personal computer 112a. The home-networking gateway 115 also may send the calendar and address book information to a calendar and address book provided by the host system 120. The PDA calendar and address book information is available locally on the home network and available on the host system 120, without requiring user intervention. The availability of the calendar and address book information on the host system 120 may be advantageous. For example, the calendar and address book information may be accessible from any location that is able to access the host system.

Figure 2:
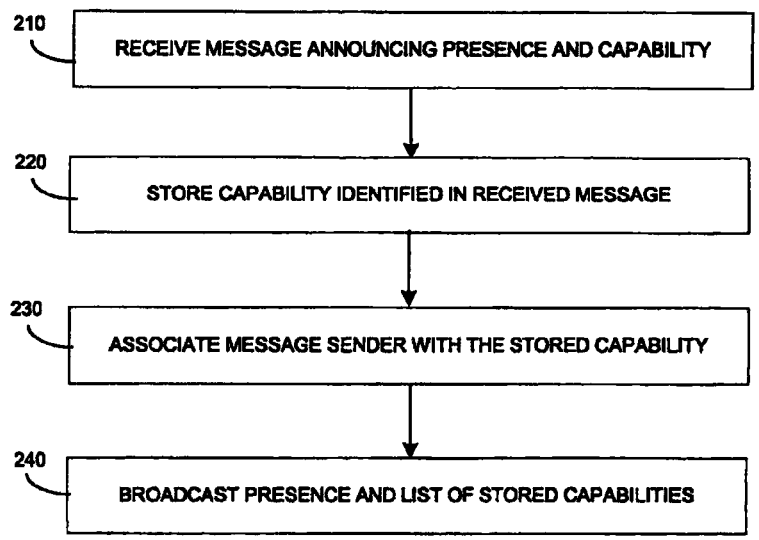
FIG. 2 is a flow chart showing a process for automatically determining capabilities of devices used in a home network.

FIG. 2 shows a process 200 to identify a capability of a device on a home network. The process 200 may be performed, for example, by a home-networking gateway, such as home-networking gateway 115 of FIG. 1.

The process 200 begins when a message that announces the presence of a device on the home network is received by the home-networking gateway (step 210). The message identifies the device that sent the message and identifies one or more capabilities that may be performed using the device.

The home-networking gateway stores the capability identified in the received message (step 220) and associates the identity of the message sender with the stored capability (step 230). For example, the home-networking gateway may modify device capability information, such as item 115b of FIG. 1, to include the capabilities included in the received message and associate each capability with the identity of the device that sent the message.

The home-networking gateway broadcasts a list of capabilities available using the home-networking gateway over the network (step 240). The list of capabilities may include capabilities of the home-networking gateway itself and capabilities that are available from other devices that are accessible through the home-networking gateway. For example, the list of capabilities accessed may be an implementation of the device capability information 115b and/or host system capability information 115c of FIG. 1. This broadcast may announce the presence of the home-networking gateway to the device that sent the received message. Additionally or alternatively, this broadcast may announce to other devices on the network the updated capabilities available thorough the home-networking gateway (e.g., the capabilities available from the device that sent the received message).

The process 200 also may be used by a home-networking gateway to identify the services that are available from a host system, such as host system 120 of FIG. 1. The home-networking gateway receives a message from the host system announcing the presence and services available on the host system (step 210), and the process proceeds as described previously.

Figure 3:
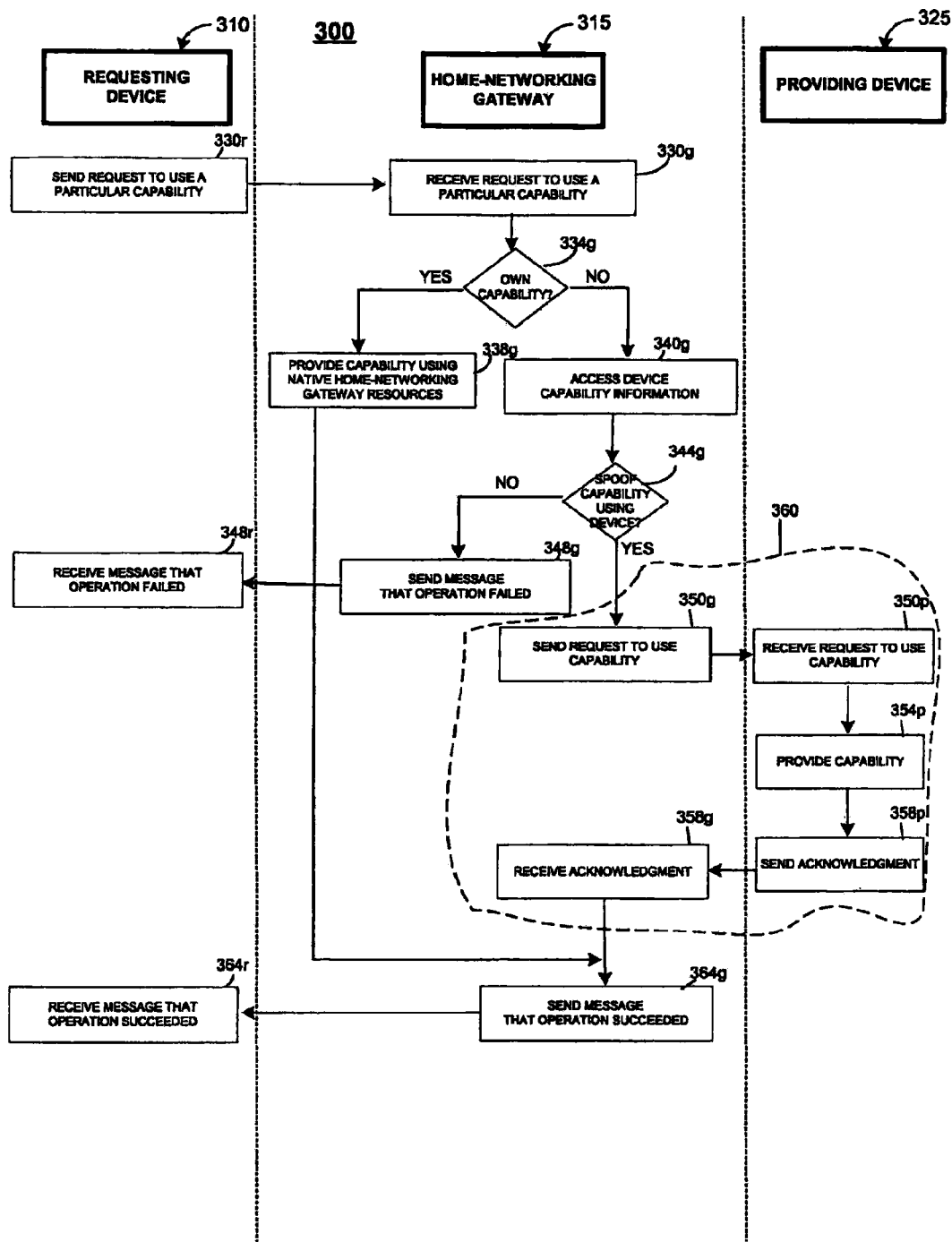
FIG. 3 is a block diagram illustrating communications between a requesting device, a home-networking gateway, and a providing device on the home network to provide a capability to the requesting device.

FIG. 3 illustrates a process 300 involving a requesting device 310, a home-networking gateway 315, and a providing device 325, all of which communicate using a home network, to provide a capability to the requesting device 310. The requesting device 310 may be an implementation of one of the devices 112 of FIG. 1, as may be the providing device 325. The home-networking gateway 315 may be, for example, an implementation of the home-networking gateway 115 of FIG. 1.

The process 300 begins when the requesting device 310 sends to the home-networking gateway 315 a request to use a particular capability of the home-networking gateway (step 330r). For example, the requesting device 310 may be aware of capabilities available from the home-networking gateway, for example, through a mutual discovery process, as described previously with respect to FIGS. 1 and 2.

The home-networking gateway 315 receives the request to use a particular capability of the home-networking gateway (step 330g). The home-networking gateway 315 determines whether the requested capability is available on the home-networking gateway 315 itself (step 334g). If so, the home-networking gateway 315 provides the capability using the resources of the home-networking gateway 315 itself. This may be referred to as using the native home-networking gateway resources (step 338g).

When the home-networking gateway 315 determines that the requested capability is not available on the home-networking gateway 315 itself (step 334g), the home-networking gateway accesses device capability information (340g). The device capability information may include a list of capabilities available using other devices on the home network, as described previously with respect to device capability information 115b of FIG. 1.

The home-networking gateway 315 determines whether the requested capability is included in the capabilities included in the device capability information (step 344g). In other words, the home-networking gateway 315 determines whether the capability may be spoofed using another device on the home network. If not, the home-networking gateway 315 sends a message to the requesting device 310 that the operation failed (e.g., that the particular capability is not available through the home-networking gateway 315) (step 348g). The requesting device 310 receives the message that the operation failed and the process 300 ends (step 348r).

When the home-networking gateway 315 determines that the capability may be spoofed using another device on the home network (here, the providing device 325) (step 344g), the home-networking gateway 315 sends to the providing device 325 a request to use the capability (step 350g).

The providing device 325 receives the request (step 350p), provides the capability (step 354p), and sends an acknowledgment to the home-networking gateway 315 (step 358p).

In one example, the providing device 325 may receive a request to provide storage for a data file that is included in the request to use a capability (here, a storage capability) in step 350p. The providing device 325 stores the data file on a storage device accessible to the providing device 325. The providing device 325 sends an acknowledgment message to the home-networking gateway 315 that indicates the data file was successfully stored and the location in which the data file was stored.

In another example, the providing device 325 may receive a request to retrieve a particular data file in storage in the request to use a capability (here, a capability to retrieve from storage) in step 350p. The providing device 325 retrieves the data file from a storage device accessible to the providing device 325. The providing device 325 sends an acknowledgment message to the home-networking gateway 315 that includes the retrieved data file.

The home-networking gateway 315 receives the acknowledgment message (step 358g). Steps 350g-358g may be referred to as a device capability spoofing sub-process 360.

When the home-networking gateway 315 provides the capability using native home-networking gateway resources (step 338g) or when the home-networking gateway 315 uses the providing device 325 to provide the capability (sub-process 360), the home-networking gateway 315 sends to the requesting device 310 a message that the operation succeeded (step 364g). The message may include data or information that is appropriate to the particular capability requested by the requesting device 310. For example, the message that the operated succeeded may include a retrieved data file or a location that was used to store data file. The requesting device 310 receives the message that the operation succeeded (step 364r).

The home-networking gateway may be said to spoof, or otherwise fool, the requesting device 310 by the appearance that the home-networking gateway 315 itself provided the capability. In other words, the requesting device 310 is unaware of that the providing device 325 provided the capability. This may be referred to as making a capability transparently available to a requesting device.

Figure 4:
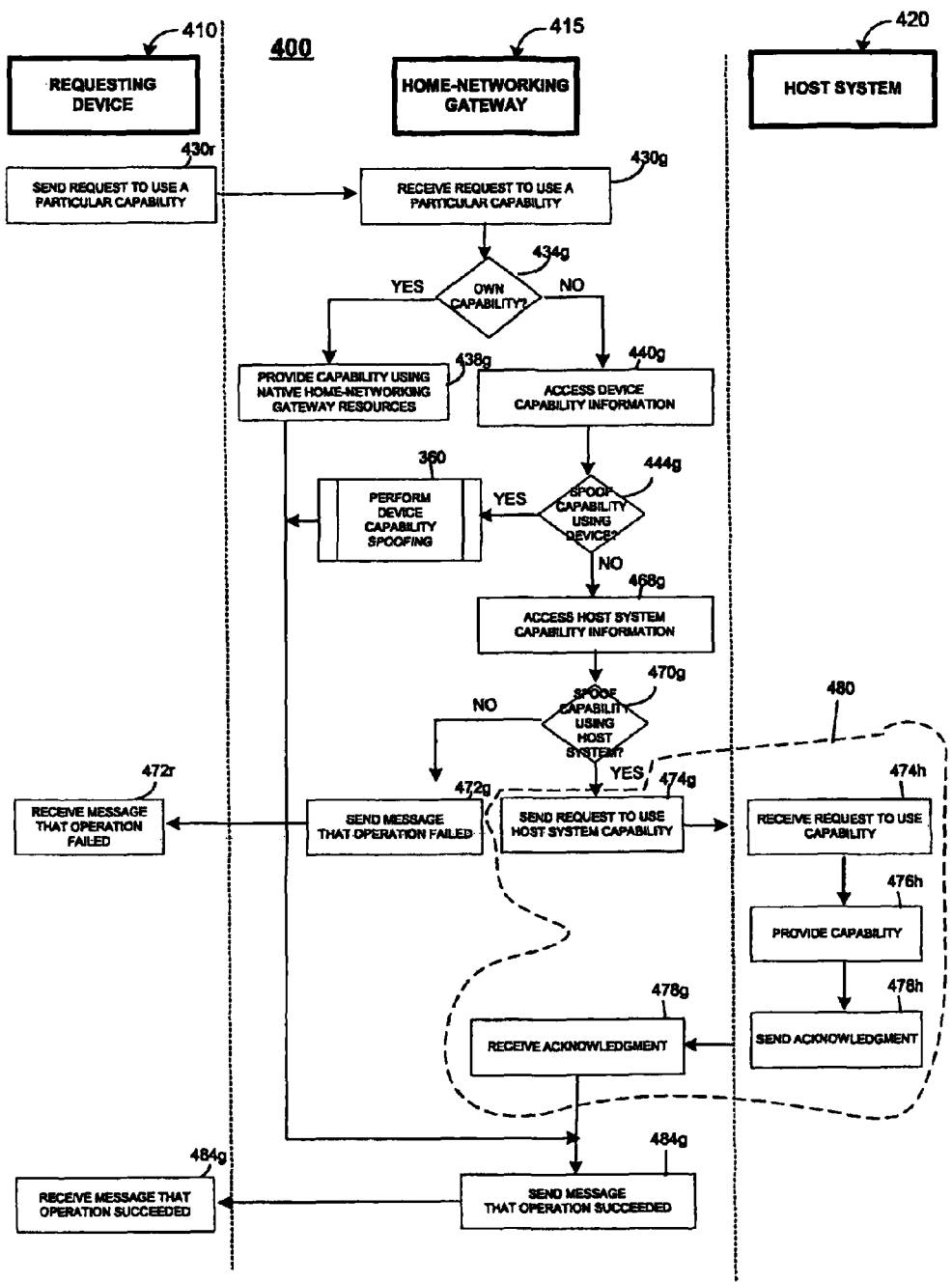
FIG. 4 is a block diagram illustrating communications between a requesting device, a home-networking gateway, and a host system to provide a capability to the requesting device.

FIG. 4 is a shows a process 400 involving a requesting device 410, a home-networking gateway 415, and a host system 420 to provide a capability to the requesting device 410. The requesting device 410 may be an implementation of one of the devices 112 of FIG. 1 or the requesting device 310 of FIG. 3. The home-networking gateway 415 may be an implementation of home-networking gateway 115 of FIG. 1 or home-networking gateway 315 of FIG. 3. The host system 420 may be a host system, such as the host system 120 of FIG. 1.

The process 400 begins when the requesting device 410 sends to the home-networking gateway 415 a request to use a particular capability of the home-networking gateway 415 (step 430r). The home-networking gateway 415 receives the request (step 430g), determines whether the request can be satisfied using the native capabilities of the home-networking gateway 415 (step 434g), and, if so, provides the capability using native home-networking gateway resources (step 438g), all of which have been described previously with respect to steps 330g-338g of FIG. 3. The home-networking gateway 415 accesses device capability information (step 440g), and determines whether the capability is able to be spoofed using a home network device (step 444g), and, if so, performs a device capability spoofing sub-process 360, all of which have been described previously with respect to steps 340g-344g and sub-process 360 of FIG. 3.

When the home-networking gateway 415 determines that the capability is not able to be provided by a device on the home network (step 444g), the home-networking gateway 415 accesses host system capability information (step 468g). The host service capability information may include a list of services available from the host system 420 and how to access each service. The host system capability information may be an implementation of host system capability information 115c of FIG. 1.

The home-networking gateway 415 determines whether the requested capability is included in the capabilities included in the host system capability information (step 470g). In other words, the home-networking gateway 415 determines whether the capability may be spoofed using the host system. If not, the home-networking gateway 415 sends a message to the requesting device 410 that the operation failed (e.g., that the particular capability is not available through the home-networking gateway 415) (step 472g). The requesting device 410 receives the message that the operation failed and the process 400 ends (step 472r).

When the home-networking gateway 415 determines that the capability may be spoofed using the host system 420 (step 470g), the home-networking gateway 415 sends to the host system 420 a request to access a host system service to use the host system capability (step 474g).

The host system 420 receives the request (step 474p), provides the capability by performing the requested service (step 476p), and sends an acknowledgment to the home-networking gateway 415 (step 478p).

In one example, the host system 420 may receive a request to provide a particular movie that is available from the host system 420. The host system 420 accesses the movie and sends an acknowledgment message to the home-networking gateway 415 that includes the movie.

The home-networking gateway 415 receives the acknowledgment message (step 478g). Steps 474g-478g may be referred to as a host system capability spoofing sub-process 480.

When the home-networking gateway 415 provides the capability using native home-networking gateway resources (step 438g), when the home-networking gateway 415 uses a device spoofing capability to provide the capability (sub-process 360), or when the home-networking gateway 415 uses the host system to provide the capability (sub-process 480), the home-networking gateway 415 sends a message that the operation succeeded (step 484g). The message may include data or information that is appropriate to the particular capability requested by the requesting device 410. For example, the message that the operated succeeded may include a retrieved data file, a location that was used to store data file, a requested movie, or a requested song. The requesting device 410 receives the message that the operation succeeded (step 484g).

In some implementations, the home-networking gateway may use a process that is less hierarchical than the process 400. For example, the home-networking gateway may access a consolidated list of capabilities that includes all of the capabilities available using the home-networking gateway itself, using any of the devices on the home network, or using the host system. The home-networking gateway then accesses the requested capability from the appropriate source (e.g., the home-networking gateway, a device on a home network, or the host system).

Figure 5:
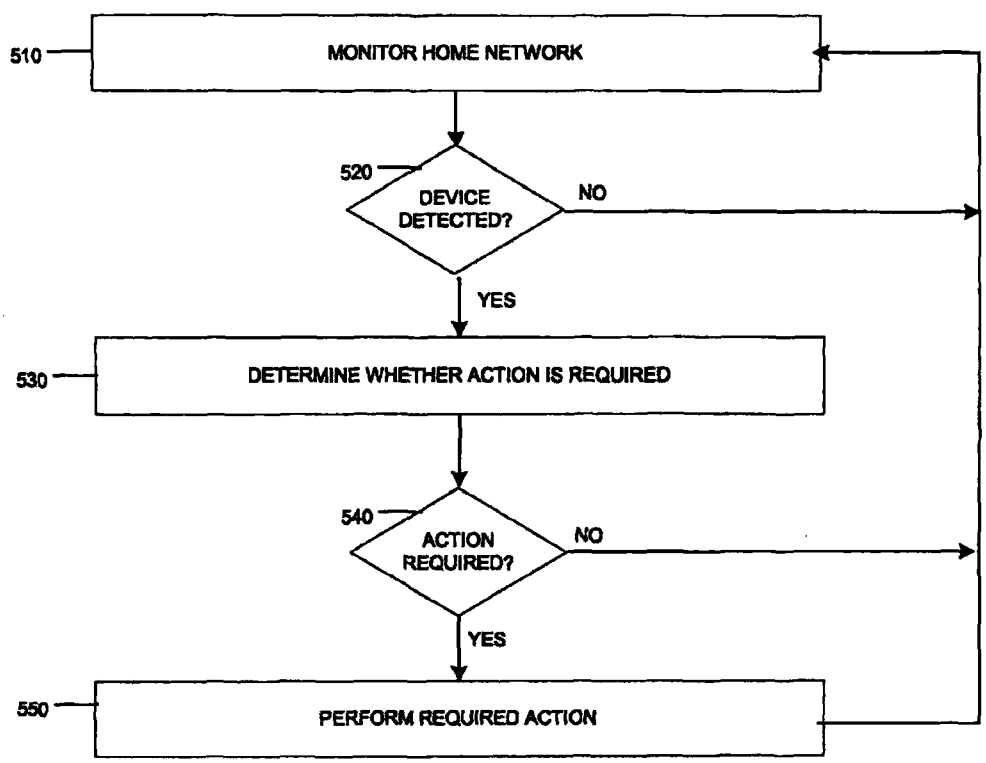
FIG. 5 is a flow chart depicting a process for automatically providing a service based on detecting a device.

FIG. 5 depicts a process 500 for automatically providing a service based on detecting a device. The process 500 may be performed by a home-networking gateway, such as home-networking gateway 115 of FIG. 1.

The process 500 begins with the home-networking gateway monitoring the home network (step 510). For example, the home-networking gateway may be waiting to receive a UPnP announcement of the presence and/or capability of a device. A device may be detected (step 520), for example, when the home-networking gateway receives a UPnP message announcing that a device has connected to the network.

When a device is detected (step 520), the home-networking gateway determines whether action is required (step 530). The home-networking gateway may determine whether action is required based on the type of the device detected (e.g., a PDA, a camera with stored photographs, and an automobile stereo system). The home-networking gateway may determine whether action is required by determining whether a script is associated with the particular type of device detected. This may be accomplished, for example, when the home-networking gateway accesses capability workflow information, such as capability workflow information 115d of FIG. 1, that associates a particular script with a particular type of device. When the home-networking gateway determines that a script is associated with the type of detected device, then the home-networking gateway determines that action is required. When the home-networking gateway determines that a script is not associated with the detected type of device, then the home-networking gateway determines that action is not required.

In some implementations, the home-networking gateway may determine whether action is required based on the detection of a particular device (e.g., a particular PDA of several PDAs that may connect to the home network) or may determine whether action is required based on a particular capability detected.

When the home-networking gateway determines that no action is required (step 540), the home-networking gateway continues monitoring the home network (step 510).

When the home-networking gateway determines that action is required (step 540), the home-networking gateway performs the required action (step 550). For example, the home-networking gateway accesses and executes the script associated with the detected type of device in capability workflow information.

The techniques described with respect to FIGS. 1-5 are illustrative. The capabilities spoofed are limited by the capabilities of the system or device being spoofed.

Although the techniques and concepts have been described in which a home-networking gateway spoofs a host system, a trusted system that may not necessarily be in a host-client relationship with the home-networking gateway may be used in place of the described host system. Another type of trusted computing device also may be used to perform the described techniques and concepts. For example, a general-purpose computer accessible to the network, such as in a peer-to-peer relationship, or another trusted computer system may be used to perform the functions described as being performed by the host system.

The techniques and concepts are applicable to home network devices other than a home-networking gateway. For example, a muter, a digital hub, a general-purpose computer, or a single-purpose configuration management device may perform the functions described as being performed by the home-networking gateway. The home-networking gateway or other similar devices may be referred to as a local proxy or a local proxy server.

Implementations may include a method or process, an apparatus or system, or computer software on a computer medium. It will be understood that various modifications may be made that still fall within the following claims. For example, advantageous results still could be achieved if steps of the disclosed techniques were performed in a different order and/or if components in the disclosed systems were combined in a different manner and/or replaced or supplemented by other components.

What is claimed is:

1. A method for managing communications, the method comprising:
   receiving, at a local-networking gateway, a request from a requesting device located in a local network for performance of a particular function;
   accessing, at the local-networking gateway, a stored indication of a function capable of being performed by another device located in the local network;
   determining, based on having accessed the indication of the function capable of being performed by the device, that the particular function cannot be completed by the device;
   retrieving, in response to determining that the particular function cannot be completed by the device, device capability information stored by the home networking gateway, the device capability information including a device identifier a device identifier associated with each of a plurality of external devices and associating a capability and a priority level for performing the capability with each device identifier;
   selecting a first external device from among the plurality of external devices, the first external device identified by the device capability information as being capable of performing the particular function, having a highest priority for performing the particular function, and available to perform the particular function, wherein the first external device is distinct from the local-networking gateway, external to the local network, and accessible to the local-networking gateway;
   forwarding, from the local-networking gateway, the request for performance of the particular function to the first external device;
   receiving, at the local-networking gateway, an indication that the first external device has performed the particular function requested by the requesting device located in the local network; and
   sending to the requesting device, form the local-networking gateway to the requesting device, an indication that the particular function requested has been performed.

2. The method of claim 1, further comprising:
   accessing, at the local networking gateway, a set of rules that comprises rules to associate a function with an identified capability.

3. The method of claim 2, wherein selecting the first external device from among the external devices comprises selecting the first external device as capable of performing the particular function based on the accessed set of rules.

4. The method of claim 1, wherein forwarding the request for performance of the particular function to the first external device comprises establishing a communication session between the local-networking gateway and the first external device.

5. The method of claim 4, wherein forwarding the request for performance of the particular function to the first external devices comprises rerouting the request from the local-networking gateway to the first external device.

6. The method of claim 1, wherein:
   receiving the request from the requesting device located in the local network for performance of the particular function comprises receiving a request from the requesting device located in the local network for printing of a file; and
   receiving the indication that the first external device has performed the particular function requested by the requesting device located in the local network comprises receiving an indication that a printer of the first external device has printed the file.

7. The method of claim 1, wherein:
   receiving the request from the requesting device located in the local network for performance of the particular function comprises receiving a request from the requesting device located in the local network for printing of a file; and
   receiving the indication that the first external device has performed the particular function requested by the requesting device located in the local network comprises receiving an indication, from a printing service resource associated with the first external device, that the file printing requested by the requesting device located in the local network has been performed.

8. The method of claim 1, wherein:
   receiving the request from the requesting device located in the local network for performance of the particular function comprises receiving a request from the requesting device located in the local network for printing of a photograph;
   receiving the indication that the first external device has performed the particular function requested by the requesting device located in the local network comprises receiving an indication, from a photograph printing service resource associated with the first external device, that the photograph printing requested by the requesting device in the local network has been performed.

9. The method of claim 8, wherein forwarding, from the local networking gateway, the request for performance of the particular function to the first external device comprises forwarding, from the local-networking gateway, the request for performance of the photograph printing function and at least one photograph to the photograph printing service resource.

10. The method of claim 1, wherein:
    receiving the request from the requesting device located in the local network for performance of the particular function comprises receiving a request from the requesting device located in the local network for storage of a file; and
    receiving the indication that the first external device has performed the particular function requested by the requesting device located in the local network comprises receiving an indication that a storage device associated with the first external device has stored the file and an identifier of the location where the file has been stored.

11. The method of claim 10, wherein forwarding, from the local networking gateway, the request for performance of the particular function to the first external device comprises forwarding, from the local-networking gateway, the request for performance of the storage function and the file to the storage device.

12. The method of claim 1, wherein:

receiving the request from the requesting device located in the local network for performance of the particular function comprises receiving a request from the requesting device located in the local network for storage of a file; and receiving the indication that the first external device has performed the particular function requested by the requesting device located in the local network comprises receiving an indication, from a storage service resource associated with the first external device, that the file storing requested by the requesting device located in the local network has been performed and a Uniform Resource Locator of the location where the file has been stored.

13. The method of claim 1, wherein:

receiving the request from the requesting device located in the local network for performance of the particular function comprises receiving a request from the requesting device located in the local network for storage of a photograph; and receiving the indication that the first external device has performed the particular function requested by the requesting device located in the local network comprises receiving an indication, from a photograph storage service resource associated with the first external device, that the photograph storing requested by the requesting device located in the local network has been performed and a Uniform Resource Locator of the location where the photograph has been stored.

14. The method of claim 1, wherein:

receiving the request from the requesting device located in the local network for performance of the particular function comprises receiving a request from the requesting device located in the local network for retrieval of a sound recording; and receiving the indication that the first external device has performed the particular function requested by the requesting device located in the local network comprises receiving an indication that a sound recording storage device associated with the first external device has retrieved the sound recording requested by the requesting device located in the local network and the retrieved sound recording.

15. The method of claim 1, wherein:

receiving the request from the requesting device located in the local network for performance of the particular function comprises receiving a request from the requesting device located in the local network for retrieval of a movie; and receiving the indication that the first external device has performed the particular function requested by the requesting device located in the local network comprises receiving an indication that a movie storage device associated with the first external device has retrieved the movie requested by the requesting device located in the local network and the retrieved movie.

16. The method of claim 1, wherein:

receiving the request from the requesting device located in the local network for performance of the particular function comprises receiving a request from the requesting device located in the local network for retrieval of a sound recording; and receiving the indication that the first external device has performed the particular function requested by the requesting device located in the local network comprises receiving an indication from a sound recording retrieval service resource associated with the first external device, that retrieval of the sound recording requested by the requesting device located in the local network and the retrieved sound recording.

17. The method of claim 1, wherein:

receiving the request from the requesting device located in the local network for performance of the particular function comprises receiving a request from the requesting device located in the local network for retrieval of a movie; and receiving the indication that the first external device has performed the particular function requested by the requesting device located in the local network comprises receiving an indication, from a movie retrieval service resource associated with the first external device, that retrieval of the movie requested by the requesting device located in the local network has been performed and the retrieved movie.

18. A method for managing communications, the method comprising:

receiving, at a local-networking gateway, a request from a requesting device located in a local network for storage of a file;

accessing, at the local-networking gateway, a stored indication of a function capable of being performed by another device located on the local network;

determining, based on having accessed the indication of the function capable of being performed by the device, that the storage of the file is not capable of being performed by the device;

retrieving, in response to determining that the storage of the file is not capable of being performed by the device and without user intervention, device capability information stored by the local networking gateway, the device capability information including a device identifier a device identifier associated with each of a plurality of external devices and associating a capability and a priority level for performing the capability with each device identifier;

selecting a storage device from among the plurality of external devices, the storage device identified by the device capability information as having characteristics of being: capable of storage of the file, having a highest priority for performing the storage of the file, and available to perform the storage of the file, wherein the storage device is distinct from the local-networking gateway, external to the local network, and accessible to the local-networking gateway;

forwarding, from the local-networking gateway, the request for storage of the file to the storage device;

receiving, at the local-networking gateway, an indication that the storage device has stored the file and an identifier of the location where the file has been stored; and sending to the requesting device, from the local-networking gateway to the requesting device, an indication that the local-networking gateway has stored the file.

19. A method for managing communications, the method comprising:

receiving, at a local-networking gateway, a request from a requesting device located in a local network for retrieval of a media file;

accessing, at the local-networking gateway, a stored indication of a function capable of being performed by another device located on the local network;

determining, based on having accessed the indication of the function capable of being performed by the device, that the retrieval of the media file is not capable of being performed by the device;

retrieving, in response to determining that the retrieval of the media file is not capable of being performed by the device and without user intervention, device capability information stored by the local networking gateway, the device capability information including a device identifier a device identifier associated with each of a plurality of external devices and associating a capability and a priority level for performing the capability with each device identifier;

selecting a media file storage device from among a plurality of external devices, the media file storage device identified by the device capability information as having characteristics of being: capable of performing the retrieval of the media file and having a highest priority for performing the storage of the file, wherein the media file storage device is distinct from the local-networking gateway, external to the local network, and accessible to the local-networking gateway;

forwarding, from the local-networking gateway, the request for retrieval of the media file to the media file storage device;

receiving, at the local-networking gateway, the media file; and sending to the requesting device, from the local-networking gateway to the requesting device, an indication that the local-networking gateway has retrieved the media file even though the media file storage device retrieved the media file.

* * * * *